(12) United States Patent
Drudis et al.

(10) Patent No.: US 8,325,925 B2
(45) Date of Patent: Dec. 4, 2012

(54) DELIVERY OF MESSAGES TO A RECEIVER MOBILE DEVICE

(75) Inventors: Antoni Drudis, Santa Clara, CA (US); Paul A. Serra, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1286 days.

(21) Appl. No.: 11/775,628

(22) Filed: Jul. 10, 2007

(65) Prior Publication Data

US 2009/0016538 A1    Jan. 15, 2009

(51) Int. Cl.
*H04L 29/06* (2006.01)
(52) U.S. Cl. .................................................. 380/279
(58) Field of Classification Search .................. None
See application file for complete search history.

(56) References Cited

U.S. PATENT DOCUMENTS

| | | | | |
|---|---|---|---|---|
| 5,392,357 | A * | 2/1995 | Bulfer et al. | 380/33 |
| 6,363,411 | B1 * | 3/2002 | Dugan et al. | 709/202 |
| 6,473,622 | B1 * | 10/2002 | Meuronen | 455/466 |
| 6,880,079 | B2 * | 4/2005 | Kefford et al. | 713/155 |
| 6,957,059 | B2 * | 10/2005 | Olah | 455/406 |
| 7,027,799 | B2 * | 4/2006 | Morin et al. | 455/408 |
| 7,245,902 | B2 * | 7/2007 | Hawkes | 455/411 |
| 7,489,781 | B2 * | 2/2009 | Klassen et al. | 380/270 |
| 7,603,697 | B1 * | 10/2009 | Kupsh et al. | 726/2 |
| 7,716,479 | B2 * | 5/2010 | Vargas et al. | 713/170 |
| 2002/0183040 | A1 * | 12/2002 | Lundstrom et al. | 455/406 |
| 2003/0050042 | A1 * | 3/2003 | Olah | 455/406 |
| 2003/0096591 | A1 * | 5/2003 | Pohutsky et al. | 455/406 |
| 2003/0162526 | A1 * | 8/2003 | Ogman et al. | 455/406 |
| 2003/0182559 | A1 * | 9/2003 | Curry et al. | 713/189 |
| 2003/0187800 | A1 * | 10/2003 | Moore et al. | 705/52 |
| 2003/0204726 | A1 * | 10/2003 | Kefford et al. | 713/171 |
| 2003/0216147 | A1 * | 11/2003 | Morin et al. | 455/466 |
| 2004/0058667 | A1 * | 3/2004 | Pienmaki et al. | 455/405 |
| 2004/0058670 | A1 * | 3/2004 | Pohutsky et al. | 455/406 |
| 2004/0102182 | A1 * | 5/2004 | Reith et al. | 455/410 |

(Continued)

FOREIGN PATENT DOCUMENTS

EP    1569482    8/2005

(Continued)

OTHER PUBLICATIONS

"SafeSMS—End-to-end encryption for SMS messages," Marko Hassinen, Department of Computer Science, University of Kuopio, P.O.Box 1627, FIN-70211 Kuopio, Finland, 8th International Conference on Telecommunications—ConTEL 2005, ISBN: 953-184-081-4, Jun. 15-17, 2005, Zagreb, Croatia.*

(Continued)

*Primary Examiner* — Oscar Louie (57) ABSTRACT

A system for delivering messages to a receiver mobile device and a method and memory storing instructions therefor are described. The system comprises a key server arranged to: transmit a first signal responsive to receipt of a message from a sender mobile device; transmit a delivery confirmation notice responsive to receipt of a second signal from the receiver mobile device; transmit a key to the receiver mobile device responsive to receipt of the second signal from the receiver mobile device; and a message server communicatively coupled with the key server and arranged to: transmit a third signal to the receiver mobile device responsive to receipt of the first signal from the key server; transmit a fourth signal to the sender mobile device responsive to receipt of the delivery confirmation notice from the key server.

12 Claims, 7 Drawing Sheets

U.S. PATENT DOCUMENTS

| | | | |
|---|---|---|---|
| 2004/0105542 A1* | 6/2004 | Takase et al. | 380/44 |
| 2005/0071508 A1* | 3/2005 | Brown et al. | 709/246 |
| 2005/0154795 A1* | 7/2005 | Kuz et al. | 709/227 |
| 2005/0221797 A1* | 10/2005 | Howard | 455/411 |
| 2006/0019634 A1* | 1/2006 | Hawkes | 455/411 |
| 2006/0101266 A1* | 5/2006 | Klassen et al. | 713/170 |
| 2006/0288211 A1* | 12/2006 | Vargas et al. | 713/170 |
| 2007/0162553 A1* | 7/2007 | Dewing et al. | 709/207 |
| 2007/0297610 A1* | 12/2007 | Chen et al. | 380/270 |
| 2007/0298719 A1* | 12/2007 | Sproule et al. | 455/66.1 |
| 2008/0085728 A1* | 4/2008 | Reding et al. | 455/466 |
| 2008/0118069 A1* | 5/2008 | Yang | 380/279 |
| 2009/0300358 A1* | 12/2009 | Pang et al. | 713/171 |

FOREIGN PATENT DOCUMENTS

| | | |
|---|---|---|
| GB | 2424804 A | 10/2006 |
| GB | 2432434 A | 5/2007 |
| WO | WO-2004049690 A | 6/2004 |

OTHER PUBLICATIONS

"Public key infrastructure in mobile systems," Dankers et al., Electronics & Communication Engineering Journal, vol. 14 Issue:5, on pp. 180-190, Dec. 16, 2002.*

EP Search Report—dated Oct. 8, 2008—Application No. 08160071.0-2414.

* cited by examiner

DELIVERY OF MESSAGES TO A RECEIVER MOBILE DEVICE

BACKGROUND

Many mobile devices are able to transmit messages, e.g., text and/or multimedia messages, in addition to including the ability to communicate telephonically, e.g., audible communication. Fees related to transmission of a message from a sender to a receiver are either incurred by the sender at the time of transmission initiation or at the time of transmission reception by the receiver. Alternatively, fees related to transmission of the message may be negotiated to be paid by the receiver in the form of the sender transmitting a first message to the receiver requesting the receiver to accept fees related to a message to be sent followed by transmission of the message to the receiver after the receiver accepts the fees.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
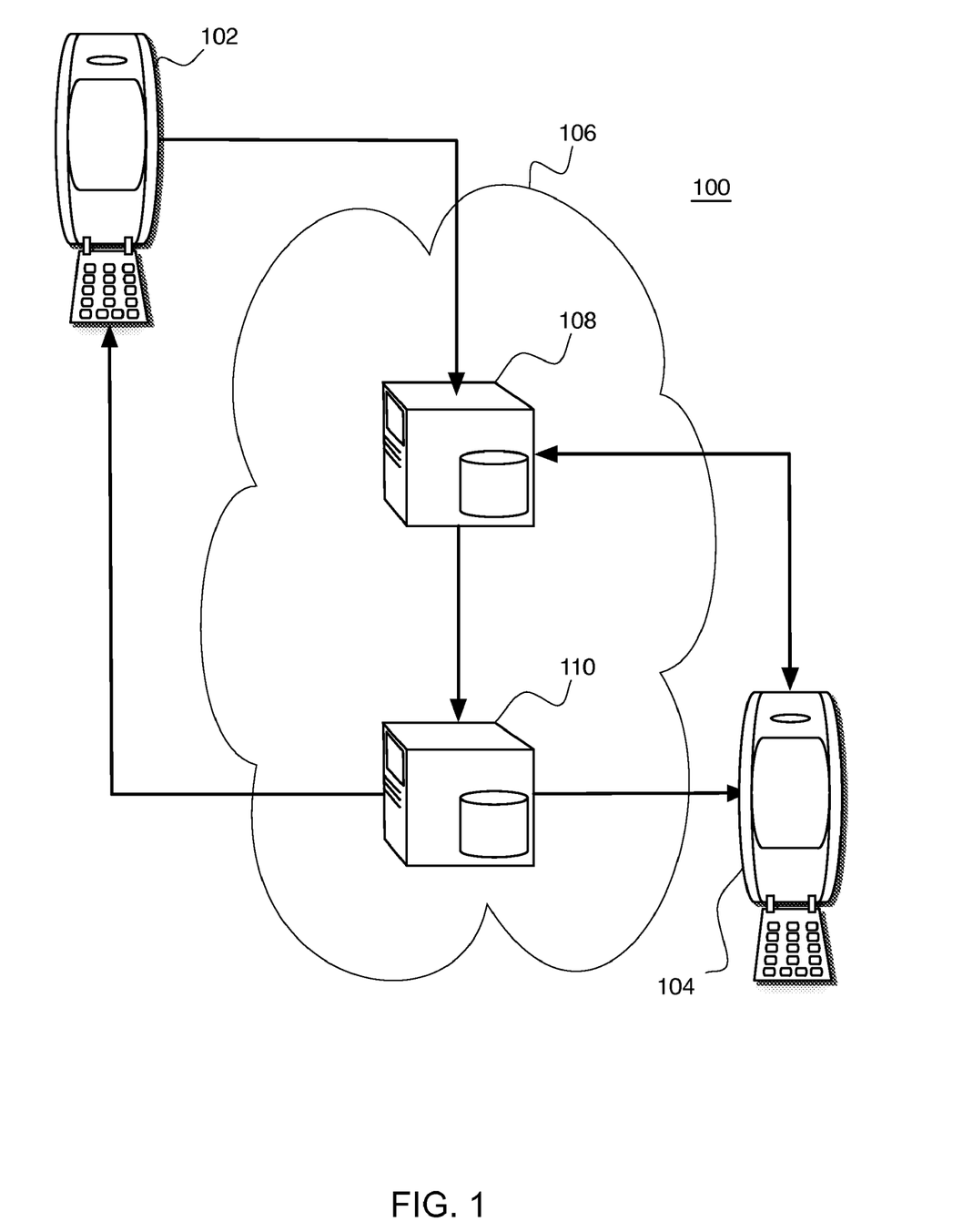
FIG. 1 is a high-level functional block diagram of a communication system in conjunction with which an embodiment may be used to advantage.

FIG. 1 depicts a high-level functional block diagram of a communication system 100 in conjunction with which an embodiment may be used to advantage. Communication system 100 comprises a sender mobile device 102 and a receiver mobile device 104 each communicatively coupled with a wireless network 106. Wireless network 106 comprises a key server 108 communicatively coupled with a message server 110, sender mobile device 102, and receiver mobile device 104.

In accordance with an embodiment, sender mobile device 102 transmits a message to receiver mobile device 104 wherein fees related to transmission of the message are incurred, based on an action of the user of the receiver mobile device, either by a user of receiver mobile device or by a user of the sender mobile device. The transmitted message may be referred to as a "collect message" as the sender is requesting the receiver to pay for receipt of the message. If, after receipt of an encrypted form of the message from sender mobile device 102, receiver mobile device 104 transmits a decryption key request to wireless network 106, then fees associated with the message are assigned to the receiver mobile device. If receiver mobile device 104 transmits a reject message to wireless network 106, then fees associated with the message are assigned to sender mobile device 102.

Wireless network 106 is a communication network comprising wired and/or wireless connections for routing messages between two or more wireless-enabled mobile devices, e.g., mobile devices 102, 104. In at least some embodiments, wireless network 106 transfers packets of information, e.g., multimedia and/or text messages, between sender mobile device 102 and receiver mobile device 104.

Key server 108 and message server 110 are processing devices, such as a computer system comprising a processor and/or an application specific integrated circuit, which communicates with mobile devices 102, 104 in accordance with a method of at least one embodiment. In at least some embodiments, key server 108 and message server 110 may comprise a single processing device.

In at least some embodiments, key server 108 is an unstructured supplementary service data (USSD) server or similar device for providing session-based communication with a mobile device. In at least some embodiments, message server 110 is a short message service (SMS) server and/or a multimedia message service (MMS) server. In at least some embodiments, message server 110 is a wireless application platform (WAP)-based server.

Mobile devices 102, 104 are referred to as "sender" and "receiver" in order to facilitate description of the embodiments herein. In at least some embodiments, mobile device 104 may be referred to as a sender and mobile device 102 may be referred to as a receiver.

In at least some embodiments, mobile devices 102, 104 are mobile communication devices such as wireless telephones, e.g., cellular mobile telephones, personal digital assistants, etc. In at least some embodiments, mobile devices 102, 104 comprise functionality, e.g., hardware, software, and/or firmware, enabling the devices to decrypt encrypted messages received from message server 110 using a decryption key received from key server 108.

Figure 2:
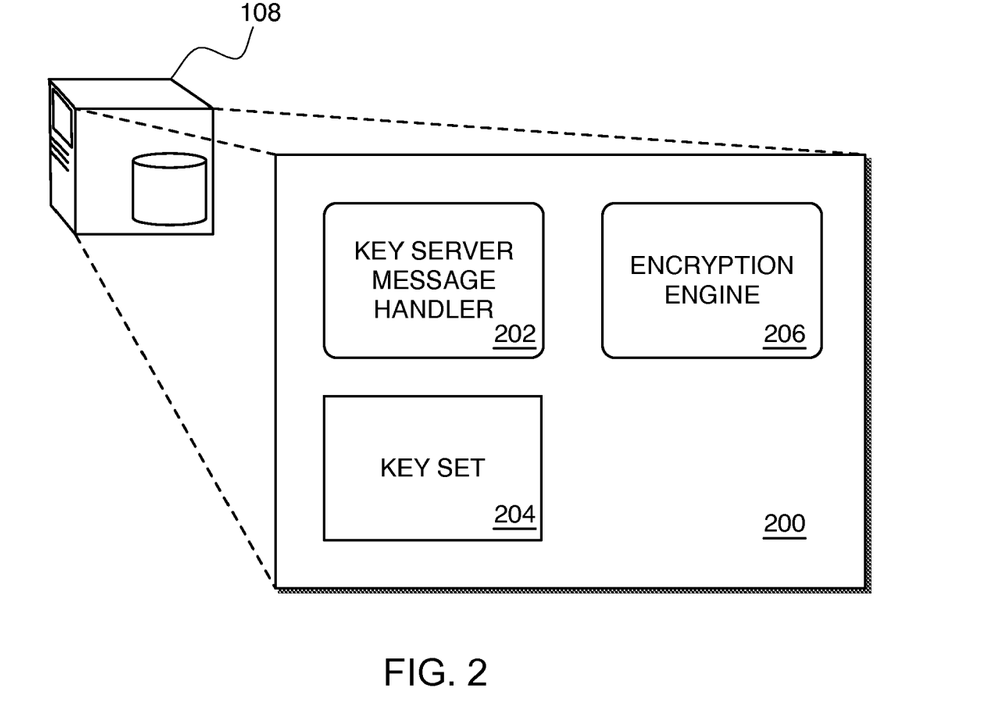
FIG. 2 is a block diagram of a portion of a memory according to an embodiment.

FIG. 2 depicts a block diagram of a portion of a memory 200 of key server 108 comprising a key server message handler 202, a key set 204, and an encryption engine 206.

Key server message handler 202 comprises a set of instructions which, when executed by a processor, cause the processor to perform a message handling functionality of key server 108 according to an embodiment. Key set 204 comprises a set of encryption keys corresponding to one or more messages handled by key server 108 executing key server message handler 202. Encryption engine 206 comprises a set of instructions which, when executed by a processor, cause the processor to perform an encryption functionality of key server 108 according to an embodiment.

Figure 3:
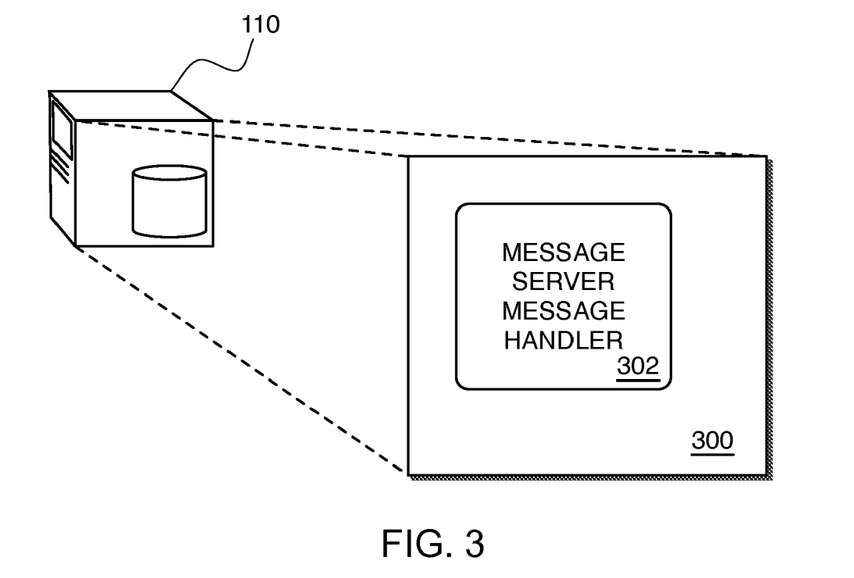
FIG. 3 is a block diagram of a portion of another memory according to an embodiment.

FIG. 3 depicts a block diagram of a portion of a memory 300 of message server 110 comprising a message server message handler 302. Message server message handler 302 comprises a set of instructions which, when executed by a processor, cause the processor to perform a message handling functionality of message server 110 according to an embodiment.

In at least some embodiments, memories 200, 300 may comprise a computer-readable medium such as a dynamic memory, a static memory, a volatile memory, a non-volatile memory, and/or a combination thereof. In at least some embodiments, memories 200, 300 may comprise a random access memory, a read only memory, a hard disk, a compact disc, a digital versatile disc, etc.

Figure 4:
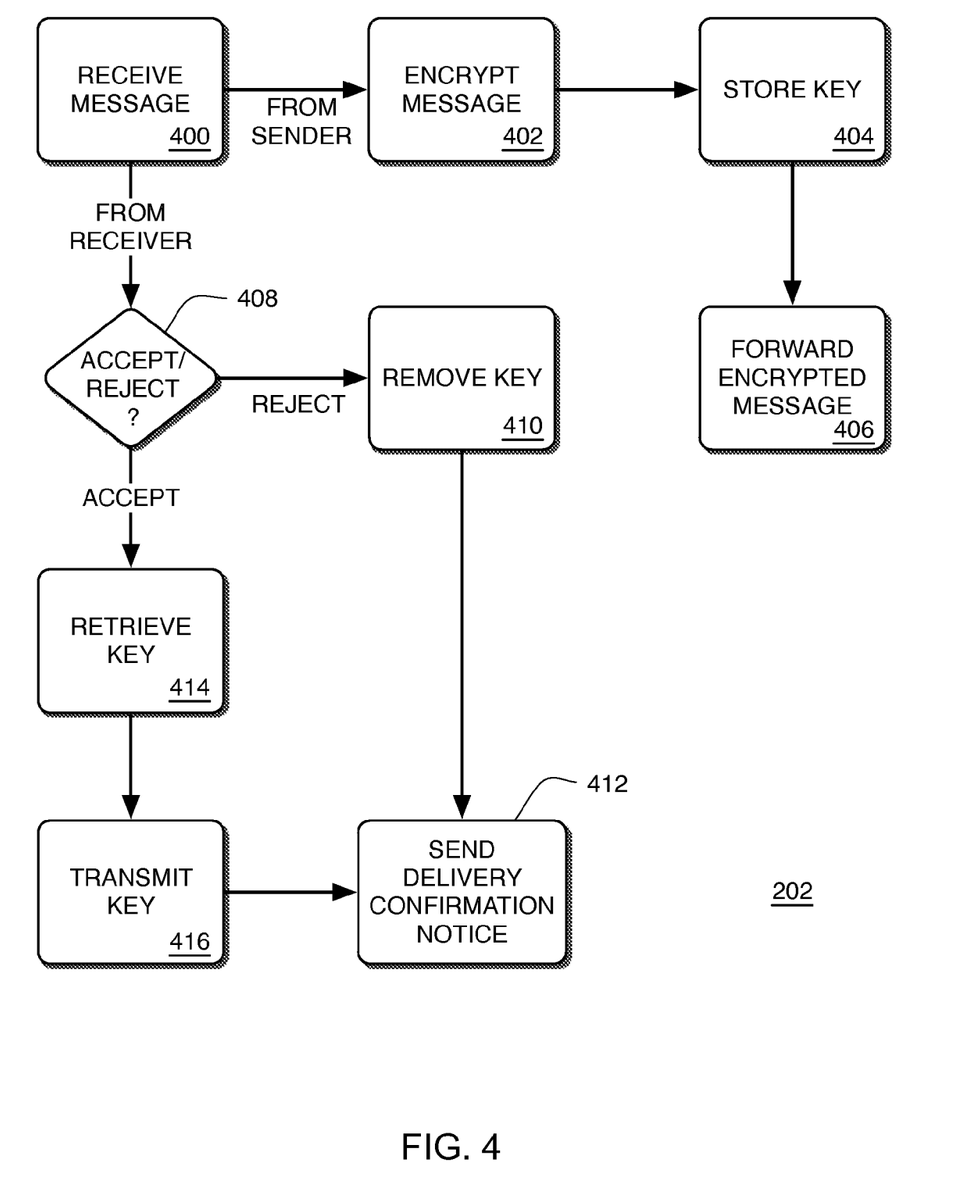
FIG. 4 is a high-level process flow diagram of a key server message handler according to an embodiment.

FIG. 4 depicts a high-level process flow diagram of at least a portion of a set of instructions comprising key server message handler 202 according to an embodiment. The process flow begins at a receive message functionality 400 wherein in response to receipt of a message, a processor of key server 108 executes a set of instructions causing the processor to receive a message.

During execution of receive message functionality 400, key server message handler 202 causes the processor to determine whether the received message is a collect message from sender mobile device 102 or receiver mobile device 104.

In at least some embodiments, a user manipulates sender mobile device 102 to cause the mobile device to transmit a selected message to key server 108. For example, in an embodiment, the user manipulates the mobile device to input a prefix dialing instruction, such as "*123," to initiate a collect message request prior to entering the destination address of the receiver and then composes and/or selects a previously composed message for transmission. In at least some embodiments, the user manipulates the mobile device to input a suffix dialing instruction to initiate a collect message request subsequent to entry of the destination address. In at least some alternative embodiments, the user manipulates one or more designated buttons on sender mobile device 102 to initiate a collect message request.

In at least some alternative embodiments, the user manipulates the mobile device to input a prefix dialing instruction followed by a predetermined destination address, e.g., a toll-free telephone number such as a 1-800 number, and the destination address to which the message is destined. The destination address is inserted by mobile device 102 into the selected message, e.g., in a first set of digits, a last set of digits, etc., prior to transmission of the message to key server 108.

If the message is a collect message from sender mobile device 102 requesting transmission, e.g., of a text and/or multimedia message, to receiver mobile device 104, the flow proceeds to encrypt message functionality 402 wherein execution of key server message handler 202 by the processor causes the processor to encrypt at least a portion of the received message. In at least some embodiments, encrypt message functionality 402 encrypts the message content. In at least some other embodiments, encrypt message functionality 402 encrypts the received message except for the destination of the message.

In at least some other embodiments, encrypt message functionality 402 encrypts a predetermined portion of the received message in order to, for example, permit a user of receiver mobile device 104 to preview an un-encrypted portion of the message content prior to obtaining the key for the message.

After at least a portion of the received message is encrypted, the flow proceeds to store key functionality 404 wherein the key server message handler 202 stores a decryption key, which is usable to decrypt at least the encrypted portion of the received message, in key set 204. The flow of control proceeds to forward encrypted message functionality 406, wherein the key server message handler 202 transmits the encrypted message to message server 110.

In at least some embodiments, a user manipulates receiver mobile device 104 to cause the mobile device to transmit a key request message to key server 108. For example, in an embodiment, the user manipulates the mobile device to input a dialing instruction, such as "*789," to initiate a key request message in response to receipt of the collect message to indicate acceptance of fees related to the collect message. In at least some embodiments, the user manipulates one or more designated buttons on receiver mobile device 104 to input a prefix dialing instruction prior to input of a predetermined address for the key request message. In at least some alternative embodiments, the user manipulates one or more designated buttons on receiver mobile device 104 to initiate key request message.

Returning to receive message functionality 400, if the message is a key request message from receiver mobile device 104, the flow proceeds to accept/reject functionality 408 wherein the key server message handler 202 determines whether the key request message requests a decryption key from key server 108 to decrypt a received encrypted message. If the determination result of accept/reject functionality 408 is negative ("REJECT" or rejection message), receiver mobile device 104 has transmitted a request key message indicating refusal of a user of receiver mobile device to incur fees related to the encrypted message. A negative determination causes the flow to proceed to remove key functionality 410 wherein the key server message handler 202 removes the encryption key associated with the encrypted message from key set 204.

The flow proceeds to send delivery confirmation notice functionality 412 wherein the key server message handler 202 transmits a message, destined for sender mobile device 102 and comprising a delivery confirmation notice, to message server 110. The transmitted delivery confirmation notice comprises information indicating receipt of the message by receiver mobile device 104 and refusal of the receiver mobile device 104 to incur fees related to the message.

In at least some embodiments, the transmitted delivery confirmation notice further comprises an indication that a fee related to transmission of the message from sender mobile device 102 to receiver mobile device 104 is incurred by the user of the sender mobile device. In at least some embodiments, the fee incurred by the user of sender mobile device 102 due to refusal of the user of receiver mobile device 104, is the fee which would have been incurred by the receiver mobile device user had the receiver mobile device user accepted the fee and requested the decryption key. In at least some embodiments, the fee incurred by the user of sender mobile device 102 may be a predetermined usage fee for transmitting a message to receiver mobile device 104 which was subsequently refused by the receiver mobile device user.

In an embodiment, if receiver mobile device 104 user refuses to incur fees related to the encrypted message, sender mobile device 102 incurs the fees related to transmission of the message and key server message handler 202 transmits the decryption key associated with the encrypted message to the receiver mobile device.

Returning to accept/reject functionality 408, if the determination result of accept/reject functionality 408 is positive ("ACCEPT" or acceptance message), receiver mobile device 104 has transmitted a request key message indicating acceptance of a user of receiver mobile device to incur fees related to the encrypted message. A positive determination causes the flow to proceed to retrieve key functionality 414 wherein the key server message handler 202 retrieves the encryption key associated with the encrypted message from key set 204.

In at least some embodiments, key server message handler 202 stores a decryption key in key set 204 based on a predetermined message identifier comprising a combination of an identifier of sender mobile device 102, an identifier of receiver mobile device 104, a message identifier, and/or a combination thereof. In at least some embodiments, the identifier may comprise a unique identifier such as a subscriber number, device number, or other identifier. In this manner, an acceptance and/or a rejection message comprising the predetermined message identifier may be used to determine the corresponding decryption key of key set 204 which is needed to decrypt the message.

The flow proceeds to transmit key functionality 416 wherein the key server message handler 202 (FIG. 2, key server 108) transmits the requested key to receiver mobile device 104. In at least some embodiments, transmit key functionality 416 further comprises remove key functionality 410 in order to cause the key server message handler 202 to remove the decryption key from key set 204 after retrieval of the key.

The flow proceeds to send delivery confirmation notice functionality 412 wherein the key server message handler 202 transmits a message, destined for sender mobile device 102 and comprising a delivery confirmation notice, to message server 110. The transmitted delivery confirmation notice comprises information indicating receipt of the message by receiver mobile device 104 and acceptance of the receiver mobile device 104 to incur fees related to the message.

Figure 5:
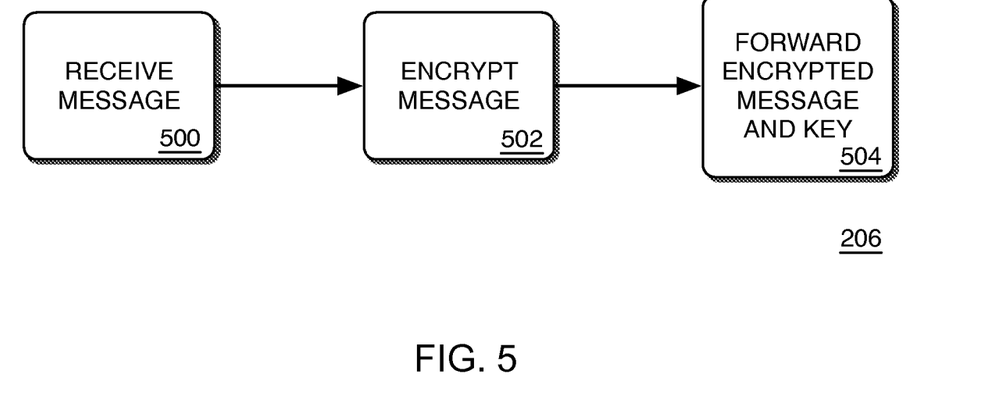
FIG. 5 is a high-level process flow diagram of an encryption engine according to an embodiment.

FIG. 5 depicts a high-level process flow diagram of at least a portion of a set of instructions comprising encryption engine 206 according to an embodiment. The process flow begins at a receive message functionality 500 wherein encryption engine 206 receives a message comprising at least a portion which is to be encrypted. For example, key server message handler 202 may invoke encryption engine 206 at encrypt message functionality 402. The process flow proceeds to encrypt message functionality 502 wherein the encryption engine encrypts at least a portion of the received message.

In at least some embodiments, encryption engine 206 may perform the encryption using an encryption method such as a public-private key pair based method, a hash method, etc. In at least some embodiments, encryption engine 206 uses an encryption method determined by wireless network 106. In at least some other embodiments, encryption engine 206 uses an encryption method determined by sender mobile device 102.

The flow of control proceeds to forward functionality 504 wherein encryption engine 206 transmits the encrypted portion of the received message and a decryption key to key server message handler 202. In at least some embodiments, encryption engine 206 transmits the encrypted portion of the received message and stores the decryption key in key set 204.

Figure 6:
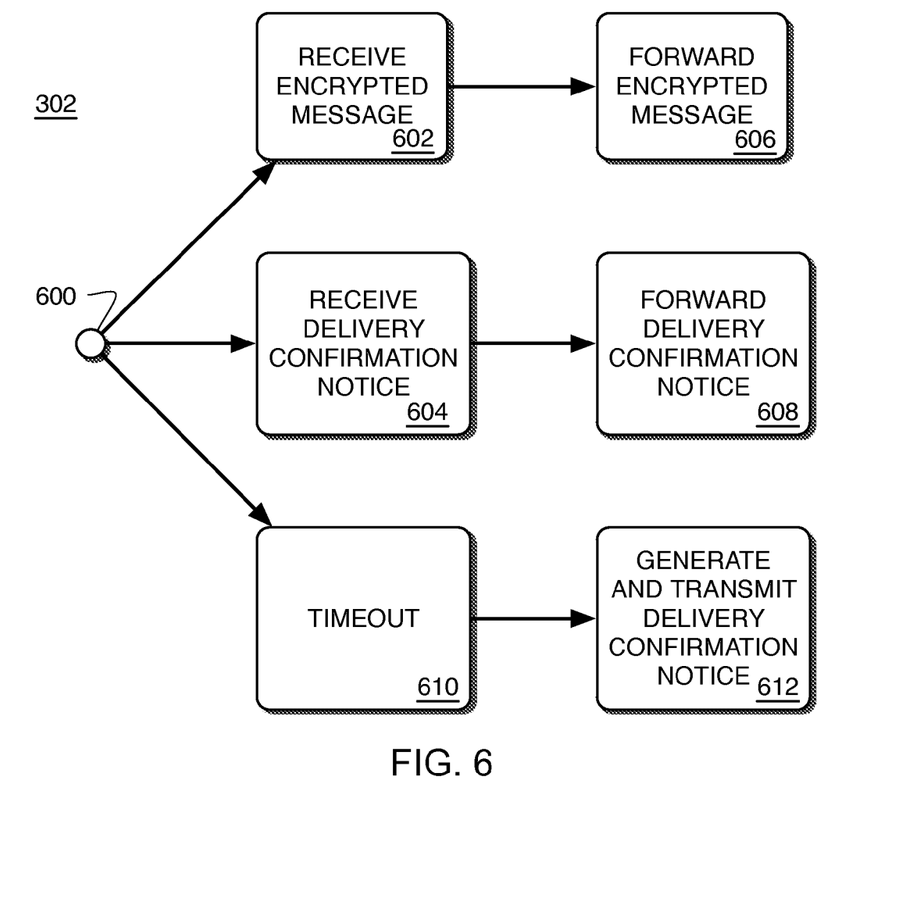
FIG. 6 is a high-level process flow diagram of a message server message handler according to an embodiment.

FIG. 6 depicts a high-level process flow diagram of at least a portion of a set of instructions comprising message server message handler 302 according to an embodiment. The process flow begins at node 600 and based on a signal received by the message server 110, the flow proceeds to receive encrypted message 602 or receive delivery confirmation notice 604.

During receive encrypted message 602, message server message handler 302 receives the encrypted message from key server 108. The flow proceeds to forward encrypted message 606 wherein message server message handler 302 causes message server 110 to transmit the encrypted message to receiver mobile device 104. In at least some embodiments, if the specified destination address, i.e., receiver mobile device 104, is not reachable by wireless network 106, message server 110 may store the encrypted message in memory 300 until the receiver mobile device becomes available at which time the message server transmits the encrypted message to the receiver mobile device.

During receive delivery confirmation notice 604, message server message handler 302 receives the delivery confirmation notice from key server 108. The flow proceeds to forward delivery confirmation notice functionality 608 wherein message server message handler 302 causes message server 110 to transmit the delivery confirmation notice to sender mobile device 102.

In at least some embodiments, message server message handler 302 may generate and transmit a delivery confirmation notice to sender mobile device 102 based on a timer reaching a predetermined timeout value. The flow of control proceeds from node 600 to timeout functionality 610 after a timer reaches the predetermined timeout value. In at least some embodiments, the timer is set during execution of forward encrypted message functionality 606. After the timer reaches the predetermined timeout value, the flow proceeds to functionality 612 wherein the message server 110 generates and transmits a delivery confirmation notice to sender mobile device 102. In at least some embodiments, during functionality 612, message server 110 also indicates acceptance of a fee related to transmission of the collect message by sender mobile device 102. That is, message server 110 causes sender mobile device 102 to be charged for the transmitted collect message.

For example, if a predetermined time has elapsed subsequent to transmission of the encrypted message to receiver mobile device without receipt of a key request message by key server 108, i.e., message server message handler 302 has not received a delivery confirmation notice from key server message handler 202, then the message server message handler may indicate that sender mobile device 102 has incurred a fee related to transmission of the message.

Figure 7:
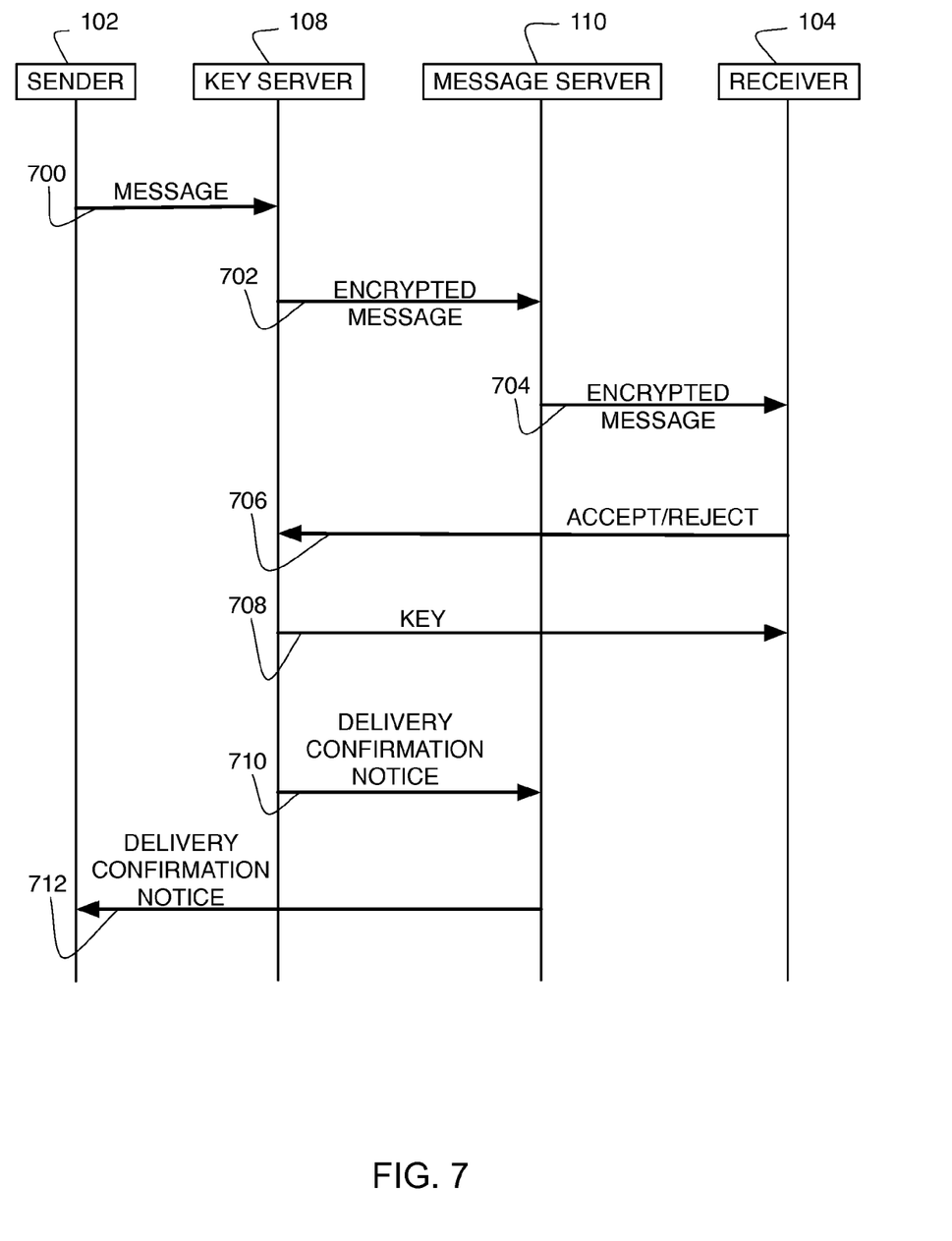
FIG. 7 is a high-level message sequence diagram of a message flow according to an embodiment.

FIG. 7 depicts a message sequence diagram of a portion of interactions between sender mobile device 102, key server 108, message server 110, and receiver mobile device 104 according to an embodiment. Time proceeds downward along the page.

Sender mobile device 102 transmits a message destined for receiver mobile device 104 to key server 108 (sequence 700). Key server 108, responsive to receipt of the message (FIG. 4 receive message functionality 400), encrypts at least a portion of the message (FIG. 4 encrypt message 402) and transmits the encrypted message (sequence 702) to message server 110.

Message server 110, responsive to receipt of the encrypted message, transmits the encrypted message to receiver mobile device 104 (sequence 704). After receipt of the encrypted message by receiver mobile device 104, the user of the receiver mobile device determines whether to accept the fee associated with obtaining the decryption key related to the encrypted message.

If the user accepts the fee, the user causes receiver mobile device 104 to transmit a key request message to key server 108 wherein the key request message indicates acceptance of the fee and requests the key associated with the received encrypted message (sequence 706). If the user rejects the fee, the user causes receiver mobile device 104 to transmit a key request message to key server 108 wherein the key request message indicates refusal of the fee (sequence 706).

If the key request message received by key server 108 indicates acceptance of the fee and/or a request for the decryption key corresponding to the encrypted message, the key server transmits the decryption key to receiver mobile device 104 (sequence 708) after retrieval from key set 204. If the key request message indicates refusal of the fee and/or no request for the decryption key, the key server does not transmit the decryption key to receiver mobile device 104.

After receipt of the key request message, key server 108 transmits the delivery confirmation notice to message server 110 (sequence 710). If the user accepted the fee, the delivery confirmation notice indicates receipt of the encrypted message and acceptance of the fee by the user. If the user refused the fee, the delivery confirmation notice indicates receipt of the encrypted message and refusal of the fee by the receiver mobile device user.

After receipt of the delivery confirmation notice, message server 110 transmits the delivery confirmation notice to sender mobile device 102.

Figure 8:
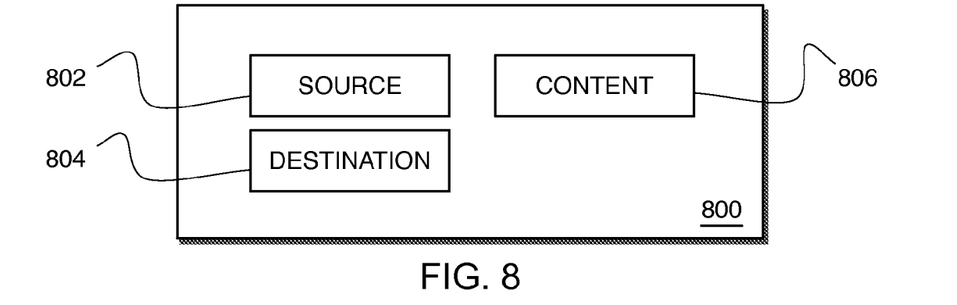
FIG. 8 is a block diagram of a message according to an embodiment.

FIG. 8 depicts a high-level block diagram of a message 800 transmitted by sender mobile device 102, i.e., a collect message. Collect message 800 comprises a source address 802 specifying the sender mobile device 102, a destination address 804 specifying the receiver mobile device 104, and one or more pieces of content 806 such as a text message, a multimedia message, etc.

Figure 9:
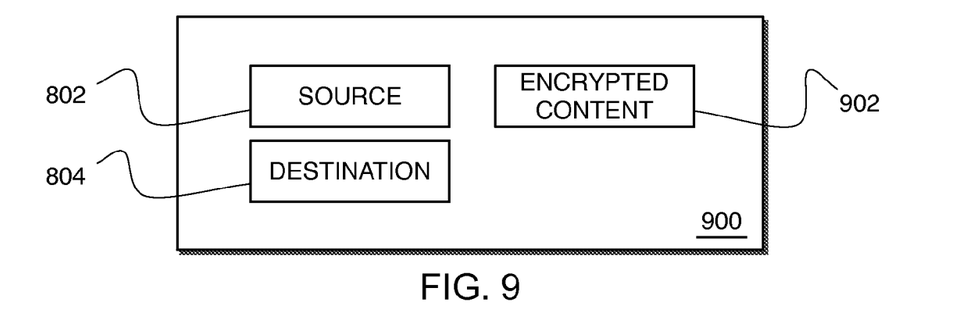
FIG. 9 is a block diagram of an encrypted message according to an embodiment.

FIG. 9 depicts a high-level block diagram of a collect message 900 similar to collect message 800 and comprising source address 802 and destination address 804. Collect message 900, also referred to as an encrypted message, further comprises one or more pieces of encrypted content 902. Encrypted message 900 is transmitted from key server 108 to the specified destination address 804, i.e., receiver mobile device 104, via message server 110. In at least some embodiments, collect message 900 is transmitted from sender mobile device 102 to key server 108.

Figure 10:
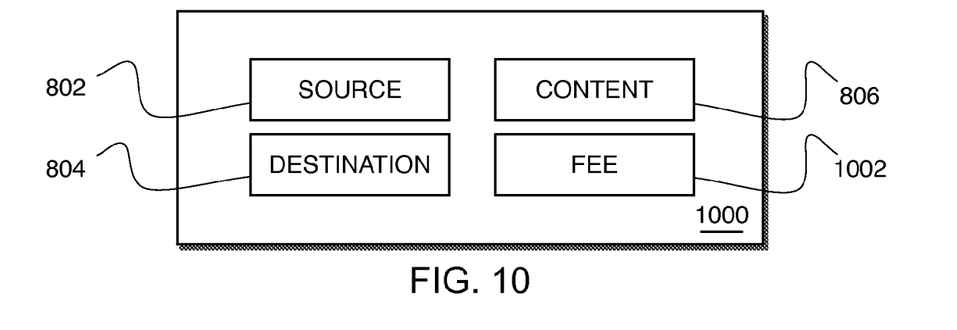
FIG. 10 is a block diagram of a message comprising a fee indicator according to an embodiment.

FIG. 10 depicts a high-level block diagram of a collect message 1000 similar to collect message 800 and comprising source address 802 and destination address 804. Collect message 1000 further comprises a fee indicator 1002 specifying a fee which the receiver agrees to pay in order to receive the decryption key from key server 108. In at least some embodiments, collect message 1000 is transmitted from sender mobile device 102 to key server 108.

Figure 11:
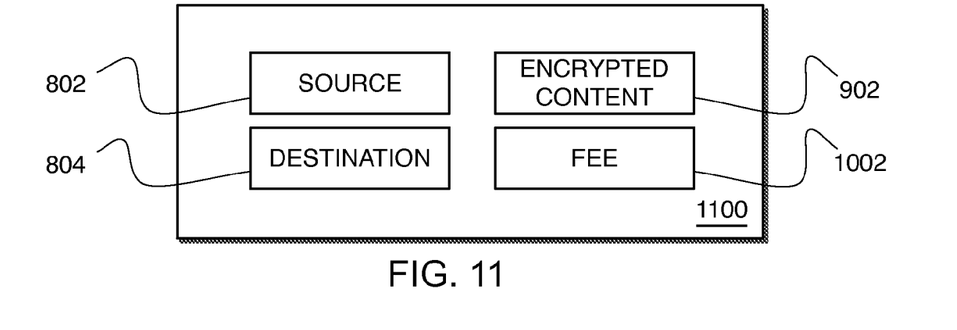
FIG. 11 is a block diagram of an encrypted message comprising a fee indicator according to an embodiment.

FIG. 11 depicts a high-level block diagram of a collect message 1100 similar to collect message 900 and comprising source address 802 and destination address 804. Collect message 1100, also referred to as an encrypted message, further comprises one or more pieces of encrypted content 902 and a fee indicator 1002. In at least some embodiments, encrypted message 1100 is transmitted from key server 108 to the specified destination address 804, i.e., receiver mobile device 104, via message server 110. In at least some embodiments, encrypted message 1100 is transmitted from sender mobile device 102 to key server 108.

In at least some embodiments, messages 800, 900, 1000, and 1100 lack source address 802 which may, instead, be tracked by wireless network 106.

In at least one alternative embodiment, sender mobile device 102 transmits a collect message in the form of encrypted message 900 or encrypted message 1100 to key server 108. That is, sender mobile device 102 encrypts content 806 prior to transmitting the collect message to key server 108. In at least some embodiments, the encrypted content 902 portion of the encrypted message is encrypted using a shared secret known to key server 108. In at least some embodiments, the encrypted content 902 portion is encrypted using an encryption method known to key server 108 or an encryption method having a known decryption method or key known to key server 108. In a still further embodiment, sender mobile device 102 transmits the decryption key to key server 108. In some embodiments, sender mobile device 102 transmits the decryption key as part of the encrypted message and in other embodiments, the sender mobile device transmits the decryption key in a separate message to key server 108. In at least some embodiments, the encryption key is the decryption key and may be referred to as "key."

Figure 12:
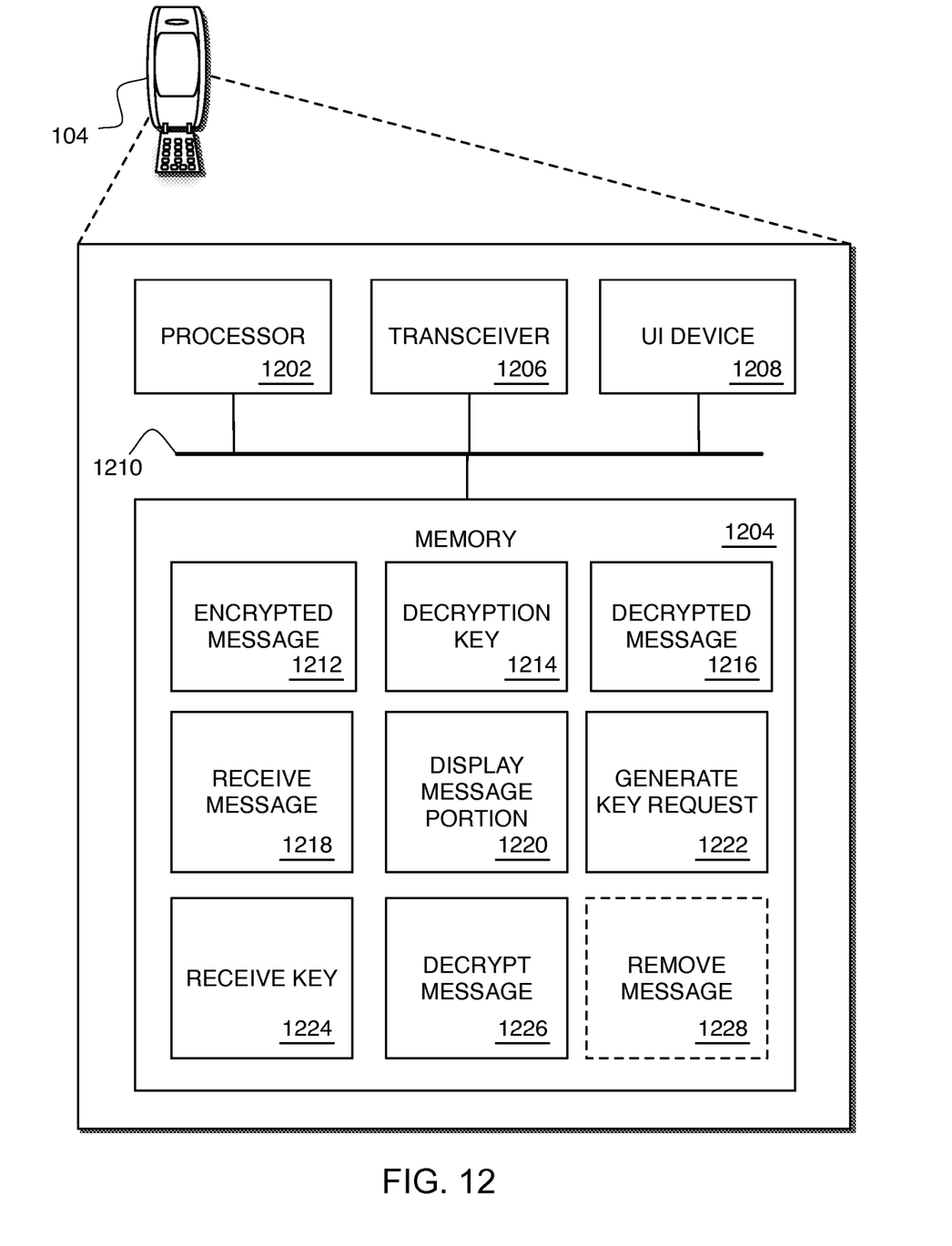
FIG. 12 is a high-level block diagram of a mobile device according to an embodiment.

FIG. 12 depicts a high-level functional block diagram of receiver mobile device 104 comprising a processor 1202, a memory 1204, a transceiver 1206, and a user interface device 1208. Receiver mobile device 104 further comprises a bus 1210 communicatively coupling processor 1202, memory 1204, transceiver 1206, and user interface (UI) device 1208. Processor 1202 executes a set of instructions read from memory 1204. Processor 1202 also causes transceiver 1206 to send and/or receive a wireless signal from communication network 106. In at least some embodiments, transceiver comprises a receiver device and a transmitter device. Processor 1202 also receives input commands and information from a user via user interface device 1208 and provides information and output to the user via the user interface device, e.g., via a display, a keypad, a touch screen, a speaker, and/or a microphone.

Memory 1204 comprises data, e.g., a received encrypted message 1212, a decryption key 1214, and a decrypted message 1216 such as a decrypted version of the received encrypted message, and one or more sets of instructions which may be read and executed by processor 1202 in order to provide one or more functions of receiver mobile device 104. The sets of instructions stored in memory 1204 comprise a receive message functionality 1218, a display message portion functionality 1220, a generate key request functionality 1222, a receive key functionality 1224, a decrypt message functionality 1226, and a remove message functionality 1228.

Execution of receive message functionality 1218 by processor 1202 causes the mobile device 104 to receive a message, e.g., an encrypted message 1212 or comprised by a portion thereof, via communication network 106. In at least some embodiments, the message and/or the encrypted message 1212 comprises an identifier identifying the encrypted message. In at least some embodiments, key server 108 may uniquely identify the encrypted message and corresponding decryption key 1214 by use of one or more of a message identifier, a receiver mobile device 104 identifier, and/or a sender mobile device identifier 102.

Execution of display message portion 1220 by processor 1202 causes mobile device 104 to display at least a portion of the received encrypted message 1212, e.g., a sender address, a subject line, a non-encrypted portion of the message, etc., to the user via UI device 1208. Further, display message portion functionality 1220 is arranged to cause UI device 1208 to display one or both of decryption key 1214 and decrypted message 1216 to the user. In at least some embodiments, display message portion functionality 1220 comprises instructions to cause UI device 1208 to display a user interface requesting the user to indicate whether to accept or reject a collect message.

Execution of generate key request functionality 1222 by processor 1202 causes mobile device 104 to create and transmit a key request message (sequence 706 of FIG. 7) to key server 108. The key request message may comprise an acceptance message or a rejection message. In at least some embodiments, generate key request functionality 1222 comprises instructions to cause UI device 1208 to display a user interface requesting the user to indicate whether to accept or reject a collect message. In at least some embodiments, display message portion functionality 1220 comprises instructions to cause UI device 1208 to display a user interface requesting the user to indicate whether to accept or reject a collect message. In at least some embodiments, generate key request functionality 1222, during execution by processor 1202, causes the transmitted key request message to comprise an identifier identifying the encrypted message 1212. The transmitted key request message may further comprise an identifier such as the address and/or telephone number of mobile device 104 to aid in identifying the encrypted message 1212 by key server 108.

Execution of receive key functionality 1224 by processor 1202 causes mobile device 104 to receive decryption key 1214 via communication network 106. In at least some embodiments, decryption key 1214 comprises an identifier identifying the encrypted message 1212 to which the key corresponds and which may be decrypted using the key. Receive key functionality 1224 is also arranged to cause processor 1202 to store the received decryption key 1214 in memory 1204. In at least some embodiments, decryption key 1214 comprises a message identifier identifying the encrypted message 1212 to which the decryption key corresponds.

Execution of decrypt message functionality 1226 by processor 1202 causes mobile device 104 to decrypt encrypted message 1212 using decryption key 1214. In at least some embodiments, decrypt message functionality 1226 may cause execution of display message portion 1220 to display the decrypted message to the user via UI device 1208.

Execution of optional remove message functionality 1228 by processor 1202 causes mobile device 104 to remove, e.g., to delete or otherwise remove from memory 1204 and/or remove references to, one or more of encrypted message 1212, decryption key 1214, and decrypted message 1216. In at least some embodiments, remove message functionality 1228 is arranged to execute to remove the encrypted message 1212 in response to one or more of a user input received at UI device 1208 and a signal from key server 108. In at least some embodiments, encrypted message 1212, decryption key 1214, and/or decrypted message 1216 may comprise an expiration time after which remove message functionality 1228 executes to remove the message and/or key from memory. In at least some embodiments, creation of and/or transmission of a key request message comprising a rejection message may cause execution of remove message functionality 1228 with respect to the rejected message.

What is claimed is:

1. A mobile device for receiving a collect message, comprising:
   a processor;
   a receiver device communicatively coupled to the processor;
   a transmitter device communicatively coupled to the processor; and
   a memory communicatively coupled to the processor and arranged to store a set of instructions which, when executed by the processor, cause the processor to:
   store in the memory at least a portion of a collect message received via the receiver device from a key server wherein the collect message comprises an encrypted portion;
   transmit, subsequent to receipt of the collect message, a signal comprising at least one of a key request message and a rejection message; and
   receive a stored key from the key server responsive to the key request message, wherein the key decrypts the encrypted portion,
   wherein the key server, prior to sending the collect message to the mobile device, receives the collect message from a sender mobile device, encrypts the collect message using the stored key wherein the stored key is specific to the collect message, and the stored key specific to the encrypted message is received in a key signal from the sender mobile device or is determined from a key set stored at the key server.

2. A system for delivering messages to a receiver mobile device, comprising:
   a key server to:
   receive a message from a sender mobile device;
   encrypt the received message using a key;
   store the key specific to the encrypted message, wherein the key specific to the encrypted message is received in a key signal from the sender mobile device or is determined from a key set stored at the key server;
   transmit, to a message server communicatively coupled to the key server over a communications network, the encrypted message, wherein the message server transmits a second encrypted message to the receiver mobile device responsive to receipt of the encrypted message from the key server;
   receive from the receiver mobile device a signal comprising at least one of a key request message and a rejection message;
   transmit the stored key to the receiver mobile device responsive to receipt of the key request message from the receiver mobile device;
   remove the stored key responsive to receipt of the rejection message from the receiver mobile device; and
   transmit a delivery confirmation notice to the message server.

3. The system of claim 2, wherein the delivery confirmation notice transmitted from the key server comprises at least one of an acceptance message and a rejection message.

4. The system of claim 2, wherein a delivery confirmation notice transmitted from the message server to the sender mobile device comprises at least one of an acceptance message and a rejection message.

5. The system of claim 2, wherein the second encrypted message transmitted from the message server comprises a fee indicator specifying a fee chargeable to the receiver mobile device.

6. The system of claim 2, wherein the message server is further arranged to indicate a fee incurred by the receiver mobile device responsive to the delivery confirmation notice comprising an acceptance message.

7. The system of claim 2, wherein the message server is further arranged to indicate a fee incurred by the sender mobile device responsive to the delivery confirmation notice comprising a rejection message.

8. The system of claim 2, wherein the stored key comprises a predetermined message identifier.

9. A method of delivering messages to a receiver mobile device, comprising:
   encrypting a message received from a sender mobile device using a key;
   storing the key specific to the encrypted message in a key server, wherein the key specific to the encrypted message is received in a key signal from the sender mobile device or is determined from a key set stored at the key server;
   transmitting to a message server the encrypted message, wherein the message server transmits a second encrypted message to the receiver mobile device responsive to receipt of the encrypted message from the key server;
   retrieving the stored key responsive to a key request message from the receiver mobile device or removing the stored key responsive to a rejection message from the receiver mobile device; and
   transmitting a delivery confirmation notice to the message server.

10. The method of claim 9, wherein the key request message further comprises indicating acceptance of a fee by the sender mobile device responsive to a predetermined timeout period.

11. The method of claim 9, wherein the encrypted message is a collect message.

12. The method of claim 11, wherein the key request message is an indication of acceptance of the collect message by the receiver mobile device.

* * * * *